United States Patent Office 3,644,390
Patented Feb. 22, 1972

3,644,390
2,5-OXAZOLIDINEDIONE DERIVATIVES OF S-OXIDIZED SULFUR-CONTAINING AMINO ACIDS
Raffaele Bernetti, Palos Park, and David W. Holty, Naperville, Ill., assignors to CPC International Inc.
No Drawing. Filed Dec. 17, 1968, Ser. No. 784,483
Int. Cl. C07d 85/34
U.S. Cl. 260—307           3 Claims

ABSTRACT OF THE DISCLOSURE

Amino acid derivatives represented by the following structural formula:

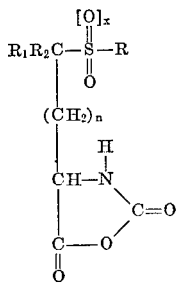

where R is selected from the group consisting of alkyl, aralkyl, aryl, and alkenyl groups, $R_1$ and $R_2$ are selected from the group consisting of hydrogen, alkyl, aralkyl, aryl and alkenyl groups, $n$ is a positive integer ranging from 0 to 5, and $x$ is either 0 or 1. Polypeptides prepared from the above amino acid derivatives are useful as temporary skin substitutes.

---

This invention is concerned with novel sulfur-containing amino acid derivatives from which polymeric films can be made which can be used as temporary skin substitutes.

Third degree burns or full-thickness burns are characterized by deep destruction of the skin and the blood supply to the burn area. Elements capable of reepithelialization are destroyed. Thus, the wound will not heal because new skin will not spontaneously grow over the surface of the wound. The underlying tissue must sufficiently heal to be in condition to receive the autograft, and during this time of healing a temporary skin substitute is extremely useful. While a number of temporary skin substitutes are available, none of the materials have proven to be very satisfactory for various reasons. For example, in some instances the temporary skin substitute cracks. In other situations, the skin substitute fails sufficiently to prevent loss of excess amounts of fluid, electrolyte and protein or fails to prevent invasive infection.

It would be a distinct advance in the art if a new class of monomers could be prepared from which polymeric films could be made to have excellent utility as temporary skin substitutes.

In view of the above, it therefore becomes an object of the invention to provide a new class of amino acid derivatives which, when polymerized, form films having excellent utility as temporary skin substitutes.

Another object of the invention is to provide the above class of materials by a simple and economical process scheme which can be carried out with a minimum of time effort and produces the desired product in relatively high yields.

Other objects will appear hereinafter.

In accordance with the invention we have discovered a new class of amino acid derivatives, which when polymerized, form films which are useful as temporary skin substitutes. These derivatives which are 2,5-oxazolidinedione derivatives of S-oxidized sulfur-containing amino acids may be represented by the following structural formula:

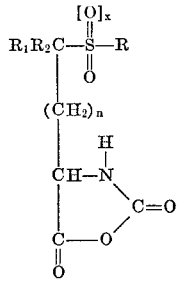

where R is selected from the group consisting of alkyl, aralkyl, aryl and alkenyl groups, $R_1$ and $R_2$ are selected from the group consisting of hydrogen, alkyl, aralkyl, aryl and alkenyl groups, $n$ is an integer ranging from 0 to 5 and $x$ is 0 or 1.

Thus, R, $R_1$ and $R_2$ may be methyl, ethyl, n-propyl, t-butyl, heptyl, hexadecyl, and the like alkyl radicals which may also be substituted with hydroxy, halo, alkyl or other substituents. Again, R, $R_1$ and $R_2$ may be propenyl, vinyl, butenyl, and higher unsaturated groups. Also, R, $R_1$ and $R_2$ may represent phenyl, and alkyl substituted phenyl groups.

The above compounds which are R-sulfinyl or R-sulfonyl derivatives of amino acid N-carboxy anhydrides may also be called 4-(R-sulfinylalkyl)-2,5-oxazolidinediones and 4-(R-sulfonylalkyl)-2,5-oxazolidinediones.

Preferred compounds are the N-carboxy anhydride derivatives of oxidized methylcysteine or oxidized methionine. In these cases R will be methyl, $R_1$ and $R_2$ will be hydrogen and $n$ will be 0 (derived from methylcysteine) or $n$ will be 1 (derived from methionine).

The compounds of the invention, broadly speaking, are made by providing a sulfur-containing amino acid having the formula:

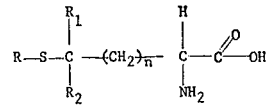

where R, $R_1$, $R_2$ and $n$ are as noted above, oxidizing said amino acid to an intermediate having the formula:

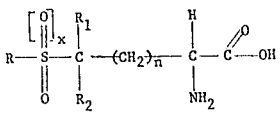

where R, $R_1$, $R_2$, $x$ and $n$ are as above, and making the compounds of Formula I by synthesizing the N-carboxy anhydride of said intermediate by reaction of said intermediate with phosgene.

As noted above, the preferred compounds which are oxidized and then derivatized to N-carboxy anhydrides by reaction with phosgene are methylcysteine and methionine.

The just-discussed derivatives when polymerized to the sulfur-containing polypeptide polymers are particularly useful in protecting and promoting the healing of wounds, such as for example, third degree burns. The wounds are covered with a sterile polypeptide film which thus act as temporary skin substitutes.

The polymerization is carried out in a solution such as ethyl acetate using an initiator such as sodium phenylalanate. The polymers are then precipitated from solution, isolated and dried and films cast therefrom in the conventional manner. The films have a molecular weight ranging from about 10,000 up to 1,000,000 or more. Generally, they have a molecular weight falling within the range of from about 20,000 to about 70,000.

While the above compounds can be prepared from the parent amino acid by phosgene treatment followed by oxidation, it is greatly preferred that the oxidation step be followed by the phosgene treatment, since most N-carboxy anhydrides can be expected to polymerize in the presence of common oxidants.

In order to oxidize a sulfur-containing amino acid to provide a sulphinyl derivative, that is, an amino acid containing a sulfoxide group, one may employ a typical method described in Biochem. J. by J. A. Roper and H. McIlwain, 42 (1948), pp. 485–492. Essentially this method involves reacting amino acids such as methionine with a glacial acetic acid-hydrogen peroxide system to produce the resultant oxidized derivative.

A typical method useful in oxidizing a sulfur-containing amino acid to the sulfone derivatives is described in J. Biol. Chem. by G. Toennies and J. J. Kolb, 140 (1941), pp. 131–134. Here the oxidizing system consists of perchloric acid, ammonium molybdate and hydrogen peroxide.

The preparation of the N-carboxy anhydrides from the oxidized amino acids by treatment with phosgene is usually carried out in a suitable medium, preferably in aromatic solvents such as tetrahydrofuran or tetramethyl urea. The phosgenation may be carried out on both the free base amino acid and amino acid hydrochloride. The phosgenation reaction may also be carried out below or above room temperature or even up to the reflux temperature of the solvent. Temperature is not considered critical here, and will depend upon the particular oxidized amino acid being utilized and solvent medium employed as well as on other factors.

Phosgene can be bubbled as a gas through the starting amino acid material held in suspension or solution, or it may be predissolved into the medium in large excess and the starting material subsequently added. Depending upon conditions and reactivity, the reaction is usually complete within a range from about 1 hour up to about 72 hours. Completion of the reaction is observed through a gradual solution of the starting material in the medium, and/or by appearance of a separating solid product. The product is then recovered by conventional techniques after removal of unreacted phosgene. For example, the organic solvent utilized as a solvating medium may be removed by a vacuum distillation of a reaction mass to dryness. The N-carboxy anhydride derivative may then be purified by recrystallization from the residue.

In some instances when a sulfoxide-containing amino acid is reacted with phosgene the resultant product disproportionates to two products, one containing a sulfide group, and the other containing a sulfone group. However, the speed of disproportionation varies, and in some instances, the polymers may be prepared from the 4-(sulfinylalkyl)-2,5-oxazolidinediones before this reaction occurs.

The following examples illustrate typical composition falling within the scope of the invention and the preparation of films from these derivatives which are useful as temporary skin substitutes.

EXAMPLE I

Preparation of 4-[2-(methylsulfonyl)-ethyl]-2,5-oxazolidinedione

Into 650 ml. of refluxing anhydrous tetrahydrofuran is slurried 24.0 g. (0.133 moles) of methionine sulfone (recrystallized to 254° C. M.P.). A slow, steady stream of phosgene is introduced, and after several hours the slurry has become a homogeneous solution. The solution is cooled, sparged for one hour with nitrogen, and evaporated slowly at room temperature under aspiration. Three crops of white crystals, totalling 16.1 g. (M.P. 153–155° C.), are obtained. The crystals can be recrystallized from anhydrous ethyl acetate. After two recrystallizations, an analytically pure sample gives the following combustion results:

Calc. for $C_6H_9NO_5S$ (percent): C, 34.78; H, 4.38; N, 6.76; S, 15.47. Found (percent): C, 34.53; H, 4.35; N, 6.65; S, 15.73.

EXAMPLE II

Preparation of 4-(benzylsulfonyl-methyl)-2,5-oxazolidinedione

Into 300 ml. of anhydrous tetrahydrofuran is slurried 5.0 g. (0.0206 mole) of benzylcysteine sulfone (recrystallized to 175–176° C. M.P.). The slurry is stirred at room temperature and phosgene is introduced in a slow, steady stream. The reaction is slightly exothermic, and after an hour a clear solution is obtained. Stirring with phosgene is continued for an hour, and then the solution is sparged with nitrogen for three hours, the volume reduced to ca. 100 ml. of a clear solution. A few ml. of petroleum ether is added, and the soltion refrigerated; after several days, a gelatinous precipitate forms which is stable for months. Removal of the solvent leaves a solids residue which is unstable, melting at 150–157° C. It is not possible to prepare a pure sample of the N-carboxyanhydride for elemental analysis because of spontaneous polymerization, as evidenced by infrared analysis.

EXAMPLE III

Preparation of polymer of 4-[2-(methylsulfonyl)-ethyl]-2,5-oxazolidinedione

A solution of 0.2 g. 4-[2-(methylsulfonyl)-ethyl]-2,5-oxazolidinedione in 40 ml. dry pyridine is stirred for 30 minutes and the cloudy solution is allowed to stand overnight. The solid polymer precipitates from the pyridine and can be separated and isolated solid. It can be cast into a stable film from a solution in dimethylformamide or other solvents. Infrared analysis of the film indicates a typical polypeptide with no residual N-carboxyanhydride absorption.

EXAMPLE IV

Preparation of polymer of 4-(benzylsulfonyl-methyl)-2,5-oxazolidinedione

In a like manner, a polymerization of 4-(benzylsulfonyl-methyl)-2,5-oxazolidinedione can be effected. When this monomer is dissolved in pyridine the solution becomes immediately deep red; as the polymerization proceeds the color lightens and the solution becomes thicker and cloudy. Since the polymer is fairly soluble in pyridine, the solvent is removed by bubbling nitrogen; otherwise, the polymer can be precipitated by addition of petroleum ether.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. An amino acid derivative represented by the following structural formula:

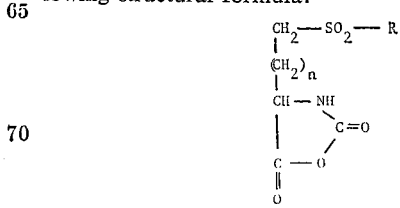

where R is methyl or benzyl and where $n$ is an integer ranging from 0 to 5.

2. The amino acid derivative of claim 1 where R is methyl, n is 0.

3. The amino acid derivative of claim 1 where R is methyl, n is 1.

References Cited

UNITED STATES PATENTS 2,662,084 12/1953 MacDonald _____ 260—307
2,993,053 7/1961 Ballard _____ 260—307

OTHER REFERENCES

Roper et al., Biochem. J. 42 (1948) pp. 485, 488, 489.
Toennies et al., J. Biol. Chem. 140 (1941) pp. 131–3.

ALEX MAZEL, Primary Examiner
R. V. RUSH Assistant Examiner

U.S. Cl. X.R.

260—112.5; 424—78, 177